(12) United States Patent
Willig et al.

(10) Patent No.: US 7,316,161 B2
(45) Date of Patent: Jan. 8, 2008

(54) ROTATION RATE SENSOR

(75) Inventors: Rainer Willig, Tamm (DE); Jochen Franz, Reutlingen (DE); Burkhard Kuhlmann, Eningen (DE); Joerg Hauer, Reutlingen (DE); Udo-Martin Gomez, Leonberg (DE); Dieter Maurer, Pfullingen (DE); Christian Doering, Stuttgart (DE); Wolfram Bauer, Tuebingen (DE); Udo Bischof, Wannweil (DE); Reinhard Neul, Stuttgart (DE); Johannes Classen, Reutlingen (DE); Christoph Lang, Pliezhausen (DE); Jens Frey, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/471,832

(22) PCT Filed: Sep. 25, 2002

(86) PCT No.: PCT/DE02/03624

§ 371 (c)(1),
(2), (4) Date: May 27, 2004

(87) PCT Pub. No.: WO03/058167

PCT Pub. Date: Jul. 17, 2003

(65) Prior Publication Data

US 2004/0206176 A1    Oct. 21, 2004

(30) Foreign Application Priority Data

Jan. 12, 2002 (DE) ............................... 102 00 948
Aug. 16, 2002 (DE) ............................... 102 37 411

(51) Int. Cl.
*G01C 19/00* (2006.01)

(52) U.S. Cl. ............................................ 73/504.12

(58) Field of Classification Search ............. 73/504.12, 73/504.02, 510, 504.14
See application file for complete search history.

(56) References Cited

U.S. PATENT DOCUMENTS

| | | | |
|---|---|---|---|
| 5,600,064 A | 2/1997 | Ward | 73/504.04 |
| 5,672,949 A | 9/1997 | Ward | 318/609 |
| 6,067,858 A | 5/2000 | Clark et al. | 73/504.16 |
| 6,089,089 A * | 7/2000 | Hsu | 73/504.12 |
| 6,230,563 B1 | 5/2001 | Juneau et al. | 73/504.04 |
| 6,386,033 B1 * | 5/2002 | Negoro | 73/504.12 |
| 6,578,420 B1 * | 6/2003 | Hsu | 73/504.16 |

FOREIGN PATENT DOCUMENTS

| | | |
|---|---|---|
| DE | 195 30 007 | 2/1997 |
| DE | 197 26 006 | 9/1998 |
| WO | 97 45699 | 12/1997 |
| WO | 01 71364 | 9/2001 |

* cited by examiner

*Primary Examiner*—Hezron Williams
*Assistant Examiner*—Tamiko Bellamy
(74) *Attorney, Agent, or Firm*—Kenyon & Kenyon LLP (57) ABSTRACT

A rotation rate sensor having a substrate and a Coriolis element is proposed, the Coriolis element being situated above a surface of a substrate; the Coriolis element being able to be induced to vibrate in parallel to a first axis (X); an excursion of the Coriolis element being detectable, based on a Coriolis force in a second axis (Y), which is provided to be essentially perpendicular to the first axis (X); the first and second axes (X, Y) being provided parallel to the surface of the substrate, wherein force-conveying means are provided, the means being provided to convey a dynamic force effect between the substrate and the Coriolis element.

8 Claims, 9 Drawing Sheets

ROTATION RATE SENSOR

FIELD OF THE INVENTION

The present invention relates to a rotation rate sensor.

BACKGROUND INFORMATION

Linearly vibrating vibration gyroscopes are generally known. In these rotation rate sensors, parts of the sensor structure are actively set into vibration (primary vibration) in one direction, i.e. in a first axis (x axis), which is oriented parallel to a substrate surface. At an outer rotation rate about a singular sensitive axis, Coriolis forces are exerted on the vibrating parts. These Coriolis forces, which vary periodically with the frequency of the primary vibration, give rise to vibrations of parts of the sensor structure (secondary vibration) that are also parallel to the substrate surface in a second direction or second axis (y axis) which is oriented perpendicular to the x axis. Means of detection are mounted on the sensor structure which detect the secondary vibration (Coriolis measuring effect).

In the lay-out of the rotation rate sensor, as described above, by design (choice of suitable symmetries) a singular cartesion coordinate system, K=(x,y) is specified for the primary and the secondary vibration within the plane of the substrate. The mass distributions and the spring distributions are laid out so that the main axis system of the mass tensors and spring stiffness tensors for the primary and secondary vibrations coincide exactly with K. In addition, in the implementation of the means of detection, care is taken that no signals are created at the means of detection for the Coriolis effect by the operation of the sensors in the primary vibration (without external rotation rate). For this purpose, the means of detection are designed so that their singular coordinate system KD also coincides with the coordinate system of the mechanics K, i.e. it is also true that KD=(x,y). Consequently, in the case of such ideal vibration rate sensors, there is not created a bridging of the primary vibration to the detection device for the Coriolis effect. Such a bridging is called a quadrature. Thus, quadrature signals are signals to the means of detection for the Coriolis effect, which are present also without a relative motion of the sensor with respect to an external inertial system, the sensor being operated in its primary vibration.

The quadrature leads to periodic signals, modulated with the frequency of the primary vibration, to the means of detection for the Coriolis effect.

The reason for the appearance of quadtature signals is that the coordinate system of the sensor element mechanics K=(x,y) does not coincide with the coordinate system of the means of detection KD=(x',y') but both systems are slightly rotated with respect to each other by an angle theta.

Typical causes for this rotation, which is generally slight, are, for example, asymmetries in the sensor structure by reason of imperfections in the manufacturing process. These are able to make themselves known by asymmetrical mass distributions or asymmetrical spring constants. As a result of this, the main axis systems of the mass tensors and the spring constant tensors no longer coincide with KD.

The appearance of quadrature is not specific for the silicon technology used for the rotation rate sensors described here, having a sensor structure made of epitactically grown polysilicon. Even in rotation rate sensors made of monocrystalline silicon material or with monocrystalline quartz, quadrature signals appear as a result of imperfections in the manufacturing process.

Another interpretation of the quadrature signals, important to an understanding of the present invention, is based on an observation with respect to interference theory: For a small twisting of the coordinate systems one may initially regard the directions of the main axis systems as interference free (K=KD). In this representation, the quadrature is described as s slight coupling of the two essential vibration modes (primary and secondary vibrations). In this representation, during the vibration of the sensor structure in primary mode, the quadrature leads to an inducement of the secondary vibrations, even without external rotation rate. This motion becomes visible as an interference signal at the means of detection for the Coriolis effect.

According to the present invention, based on the well-directed effect of time-wise periodically varying forces, a reduction or avoidance of quadrature signals is achieved. For this, electrostatic forces that vary in time (dynamic) are exerted on the sensor structure by electrode structures applied at suitable parts of the sensor structure and by the purposeful application of external electrical dc voltages. It is achieved particularly by the suitable form of the electrode structures (quadrature compensation structures) that, during the primary vibration of the sensor structures, forces varying in time act upon suitable parts within the sensor structure. These forces are oriented in such a way that they induce secondary vibrations, and may consequently be detected at the means of detection of the Coriolis effect. Because of the height of the electrical voltage, the magnitude of these signals may be varied until they exactly compensate the quadrature signals present in the sensor element because of imperfections. Consequently, the present invention represents a dynamic method for quadrature compensation.

The effect of the quadrature compensation is based, in the method according to the present invention, on a purposefully undertaken asymmetry within the mechanical sensor structure.

Quadrature interference signals in rotation rate sensors as a result of manufacturing imperfections are known, and are encountered in rotation rate sensors of the most varied technologies. In this context, according to the related art, various different methods are known for the reduction of these interference signals.

A first method, according to the related art, for suppressing quadrature signals makes use of the different phase position of rotation rate signals and quadrature signals. The Coriolis force is proportional to the speed of the primary vibration, whereas the quadrature is proportional to the excursion of the primary vibration. Consequently, there is a phase shift of 90° between the rotation rate signal and the quadrature signal. At the means of detection, quadrature signals and rotation rate signals are detected as signals amplitude-modulated with the frequency of the primary vibration. By the method of synchronous demodulation, as described, for example, in German Published Patent Application No. 197 26 006 and U.S. Pat. No. 5,672,949, the signals may first of all be demodulated again into the baseband. In addition, by a suitable choice of the phase position of the reference signal for the demodulation, the quadrature signal may be suppressed.

In this method, the quadrature signal is not influenced in the sensor element itself. Furthermore, the quadrature signal also has to pass through the primary signal conversion paths in the means of detection, and it is able to be electronically suppressed only relatively late in the signal path. In the case of large quadrature signals compared to the rotation rate measuring range, this means drastically increased requirements on the dynamic range of the first signal conversion stages, and often leads to increased sensor noise.

A second method according to the related art, for reducing quadrature signals, is the physical balancing of the mechanical sensor structures. Here, in contrast to the first method, the cause of the quadrature is directly rectified by reworking the sensor element, so that no quadrature signals appear at the means of detection. In the case of precision rotation rate sensors, this is achieved actively by iterative mechanical material surface removal at different places in the sensor element. Using this method, the principal axis system of the mass or spring constant tensors for the primary and secondary vibrations are modified so that the twisting of the coordinate system of the sensor element mechanics K with respect to the coordinate system of the means of detection KD, which is present at first, is reversed. In the case of rotation rate sensors made of monocrystalline quartz material, a surface removal of material is undertaken partially by laser trimming at singular locations in the sensor element. Here too, the mass tensor or spring constant tensor is modified so that, at the end, the twisting of K with respect to KD is essentially reversed. Even in the case of micromechanical rotation rate sensors made of monocrystalline silicon, laser trimming is used on mass structures (e.g. VSG or CRS-03 from Silicon Sensing Systems Ltd.). Furthermore, for general tuning fork rotation rate sensors, laser trimming at singular spring structures within the sensor structure is generally known. Using this method, in the operation of the sensor elements in primary vibration, the principal axis system of the spring constant tensor is able to be modified until K and KD coincide, and thus the quadrature signal is eliminated. The methods described here eliminate the quadrature in the sensor element itself, and are therefore superior to the first method, with respect to sensor performance. However, the balancing (procedure) represents a costly and often iterative as well as tedious process, and thereby a very cost-intensive process.

According to a further generally known method according to the related art, an electronic quadrature compensation is carried out in capacitive micromechanical rotation rate sensors. By doing this, the suppression of the quadrature signal is accomplished by the targeted injection of an electrical signal into the electronic transducer unit at the means of detection for the Coriolis effect. For this, the magnitude of the signal is selected so that it exactly compensates for the signal generated by the quadrature at the means of detection. In this method too, (analogous to the first method according to the related art), the mechanical cause for the quadrature signal itself is not eliminated. However, in contrast to the first method, in this case the quadrature signal is suppressed even before the primary signal conversion. This is able to reduce the requirements on dynamic range and noise of the primary signal conversion. However, a serious disadvantage of the method described is that it is suitable only for a very special design of the sensor evaluation electronics. This evaluation method (baseband evaluation), however, has serious disadvantages conditioned on principle (electrical distortion, etc), and therefore cannot be used in rotation rate sensors described in the present invention.

In U.S. Pat. No. 6,067,858, a further method according to the related art for electronic quadrature compensation in capacitive micromechanical rotation rate sensors is discussed. Between movable comb fingers and fixed electrodes, different electrical potentials are applied.

SUMMARY OF THE INVENTION

The rotation rate sensor according to the present invention has the advantage over the related art that, by using a special method, based on the targeted action of static forces, a reduction in the quadrature signals is achieved. In this context, electrostatic forces that are either changeable over time (dynamic) or changeable over time (dynamic) and constant over time (static) are exerted on the sensor structure by electrode structures applied at suitable parts of the sensor structure and by the purposeful application of external electrical dc voltages. By the suitable application of the electrode structures (quadrature compensation structures) it is achieved that the quadrature is reduced or compensated for. Consequently, the present invention represents a method for quadrature compensation using dynamic and optionally additional static forces. In this connection, the forces are generated by electrode structures applied to singular parts of the sensor structure, in such a way that an external electrical dc voltage is applied to electrodes suspended fixedly with respect to the substrate as opposed to the movable sensor structure. The method according to the present invention acts similarly to a mechanical balancing of the sensor structure. However, compared to the physical balancing, it has the advantage that the compensation is able to be carried out here by applying an external voltage (by balancing), and consequently a costly process step may be omitted.

Moreover, the method is compatible with all conceivable sensor evaluation electronics.

DETAILED DESCRIPTION

A possible embodiment of the method according to the present invention for dynamic quadrature compensation is shown below, using as the example a micromechanical rotation rate sensor. The method may be applied to a special class of rotation rate sensors. In this context, this involves linearly vibrating vibration gyroscopes. An exemplary embodiment of the present invention is explained below, first of all the essential functional components of the rotation rate sensor being briefly described in the light of the rough illustration of FIG. 1, for an understanding of the procedure of the present invention.

Figure 1:
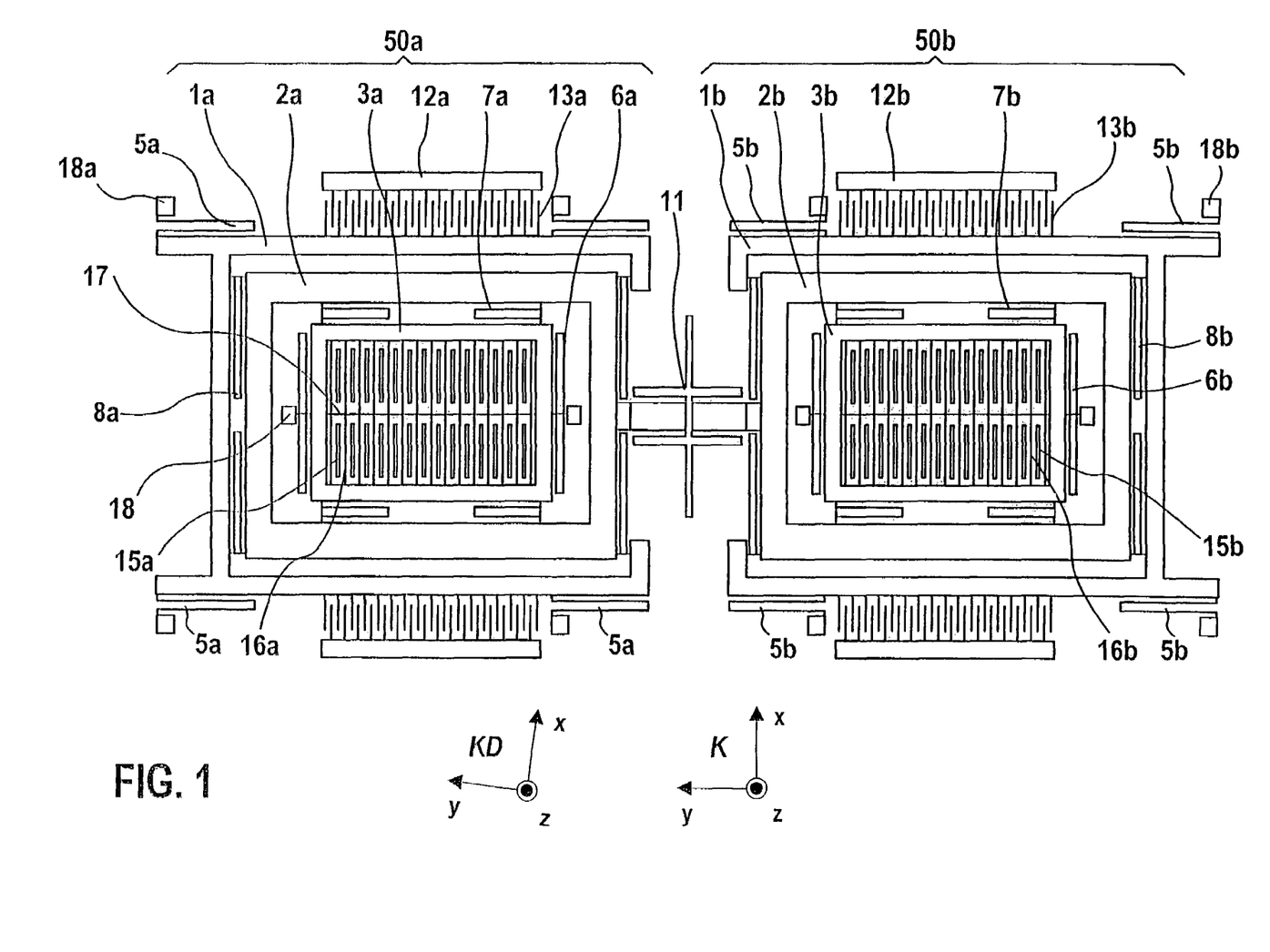
FIG. 1 shows a top view of an exemplary embodiment of a rotation rate sensor according to the present invention in a rough view.

FIG. 1 shows the top view of the structured parts or rather, the structure of a rotation rate sensor or a rotation rate sensor element, the substrate lying under the particularly micromechanically structured structure of the rotation rate sensor being not shown in greater detail, for reasons of clarity.

Silicon is preferably used as the material for the substrate and for the sensor elements situated above the substrate, and it is developed to be conductive by appropriate doping. The substrate may be electrically insulated where it is necessary using insulating layers. However, other materials such as ceramic, glass or metals may also be used for the rotation rate sensor according to the present invention.

The rotation rate sensor shown in FIG. 1 is designed according to the present invention particularly for production using pure surface micromechanics. What is sensed is a rotation about the normal to the substrate (the z axis), i.e. an axis which is perpendicular to the substrate surface, and which will from here on also be denoted as the third axis. According to the present invention, all movable parts of the structure are essentially completely load conducting, i.e. electrically conductive.

According to the present invention, the sensor structure includes especially two preferred, symmetrically designed partial structures, which are shown in the left and right parts of FIG. 1 and are denoted as reference marks 50a and 50b. However, according to the present invention it is also possible that the sensor structure according to the present invention includes only one such partial structure 50a. Each of the partial structures 50a, 50b includes three individual masses that are movable with respect to the substrate with which the reference coordinate system is connected. In this connection, there is provided inside the partial structures in each case a first mass as driving mass 1a, 1b. It is suspended on the substrate with springs 5a, 5b using anchoring means 18a, 18b in such a way that the driving mass can preferably execute only one in-plane motion (parallel to the plane of the substrate) in a first direction, or rather, according to a first axis (the x axis), and an in-plane motion in a second axis (the y axis), which is perpendicular to the first axis, is suppressed. For this purpose, springs 18a, 18b are flexible in the x direction and rigid in the y direction. The first axis is also called driving axis X; the second axis is also called detection axis Y.

Furthermore, within partial structures 50a, 50b, a third mass, which from here on will also be called detection element 3a, 3b, is suspended using springs 6a, 6b in such a way with respect to the substrate that preferably it can execute an in-plane motion only in detection direction Y, and a motion in driving direction X is suppressed. For this purpose, springs 6a, 6b are flexible in the Y direction and rigid in the X direction.

Within partial structures 50a, 50b, in each case a second mass is connected as a Coriolis element 2a, 2b to the first mass 1a, 1b and the third mass 3a, 3b by springs 7a, 7b, 8a, 8b in such a way that Coriolis element 2a, 2b is able preferably to execute an in-plane relative motion only in the detection direction, and a relative motion in the driving direction is suppressed, and that Coriolis elements 2a, 2b is able preferably to execute an in-plane relative motion only in the x direction, and a relative motion in the y direction is suppressed, so that Coriolis element 2a, 2b is able to execute both a motion in the driving direction and the detection direction. For this purpose, springs 7a, 7b between Coriolis element 2a, 2b and detection element 3a, 3b are provided flexible in the X direction and rigid in the Y direction. Springs 8a, 8b between Coriolis element 2a, 2b and driving mass 1a, 1b are provided flexible in the y direction and rigid in the x direction.

Driving mass 1a, 1b, Coriolis element 2a, 2b and detection element 3a, 3b are denoted from here on in common also as movable sensor elements 1a, 1b, 2a, 2b, 3a, 3b, since they have a certain movability with respect to the substrate that is limited by the spring elements. Sensor elements 1a, 1b, 2a, 2b, 3a, 3b are particularly provided, according to the present invention, as essentially rectangular, frame-shaped structures, Coriolis element 2a, 2b surrounding detection element 3a, 3b, and driving mass 1a, 1b surrounding Coriolis element 2a, 2b.

In one sensor structure according to the present invention, having two partial structures 50a, 50b, the two Coriolis elements 2a, 2b are connected by springs 11 so that a direct mechanical coupling of both partial structures 50a, 50b is present, both in the driving and the detecting direction, in such a way that the formation of parallel and antiparallel vibration modes in the x direction takes place (with participation of driving masses 1a, 1b and Coriolis elements 2a, 2b) (effective modes drive, primary vibration) and that the formation of parallel and antiparallel in-plane vibration modes in the y direction takes place (with the participation of Coriolis element 2a, 2b and detection elements 3a, 3b) take place (effective modes detection, secondary vibration).

The inducement or rather, the drive of the structure (primary vibration) preferably takes place in the antiparallel driving mode (first mass 1a of first partial structure 50a moves in phase opposition to first mass 1b of second partial structure 50b). The Coriolis accelerations appearing about the z axis at an external rotation rate about the z axis are then also in phase opposition, and if there is an appropriate design of the structures, this leads to an activation of the antiparallel detection mode (secondary vibrations). The desired measuring effect generated thereby may then, by a suitable evaluation, be directly distinguished from an (undesired) measuring effect, brought on by external linear accelerations in the y direction, which would act in phase on the detection of both partial structures.

The inducement of the primary vibration takes place at drive masses 1a, 1b via interdigital comb drives; also the detection of the driving motion. For this, according to the present invention, a first electrode 12a, 12b, and a second electrode 13a, 13b are provided, which generate the primary vibrations. First electrode 12a, 12b is provided rigidly connected to the substrate but electrically insulated. Second electrode 13a, 13b is connected to driving mass 1a, 1b mechanically rigid and electrically conductive. First electrode 12a, 12b and second electrode 13a, 13b, in this situation, reach into each other, finger-like, and thus form a comb structure. Consequently, when a voltage is applied between the electrodes it is possible to exert a force from the substrate on driving mass 1a, 1b.

The detection of the Coriolis acceleration takes place at means of detection particularly in the form of third and fourth electrodes inside detection elements 3a, 3b. Detection element 3a, 3b is designed for this purpose in such a way that it forms the fourth electrode as the movable part 16a, 16b of a plate capacitor device. A fixed part 15a, 16b of the plate capacitor device is denoted as the third electrode, and it is connected to the substrate in a mechanically rigid (but electrically insulated) fashion. In this context, the fixed part 15a, 15b is designed as a split-up electrode, so that the whole system forms a differential plate capacitor.

In the sensor structure, detection takes place at a structure at rest (detection at rest). This specifies that detection element 3a, 3b, and consequently movable electrode 16a, 16b of the plate capacitor system, essentially does not execute a driving motion. By the subdivision of partial structures 50a, 50b of the rotation rate sensor into driving mass 1a, 1b, Coriolis element 2a, 2b and detection element 3a, 3b one achieves a two-fold decoupling of the detection motion from the driving motion.

Figure 2:
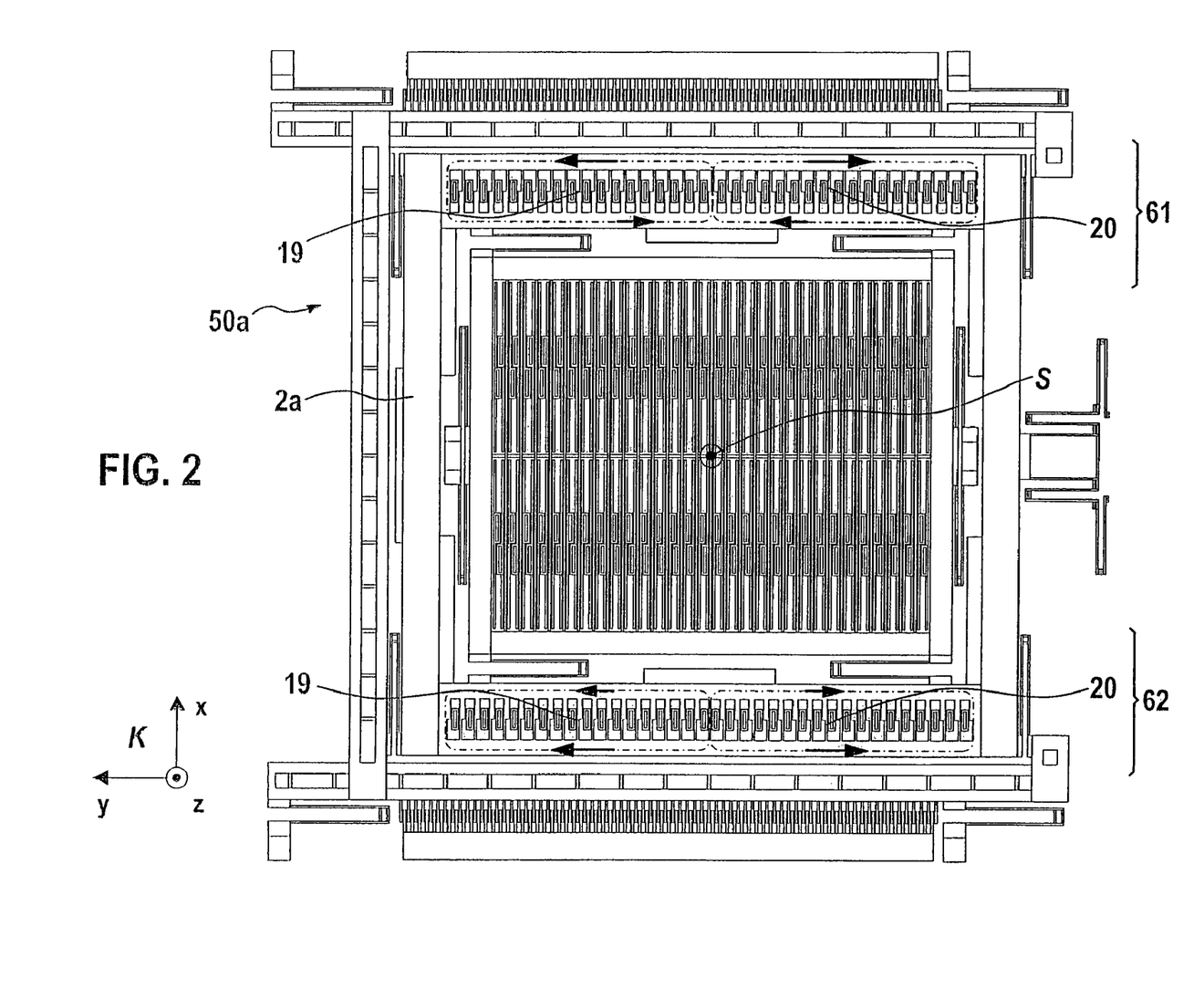
FIG. 2 shows a partial structure of a first exemplary embodiment of a rotation rate sensor according to the present invention in a detailed view.

In FIG. 2, left partial structure 50a from FIG. 1 of a rotation rate sensor according to the present invention is shown in a detailed view. For reasons of clarity, in this case only one partial structure (the left one) of the sensor element is shown.

In the layout of the rotation rate sensor, by design (choice of suitable symmetries) a singular cartesian coordinate system, K=(x,y) is specified for the primary and the secondary vibration within the plane of the substrate. The mass distributions and the spring distributions should ideally be laid out so that the main axis system of the mass tensors and spring stiffness tensors for the primary and secondary vibrations coincide exactly with K. In addition, in the implementation of the means of detection, care is taken that no signals are created at the means of detection for the Coriolis effect by the operation of the sensors in the primary vibration (without external rotation rate). For this purpose, the means of detection are designed so that their singular coordinate system KD also coincides with the coordinate system of the mechanics K, i.e. it is also true that KD=(x,y).

When the coordinate systems K and KD do not completely coincide, for instance, because of manufacturing fluctuations, quadrature signals may appear.

There is a difference made between positive and negative quadrature signals, with respect to the Coriolis measuring effect: when left partial structure 50a in FIG. 2 moves in primary vibration in the positive x direction, and a positive external rotation rate about the z axis, the Coriolis acceleration acts in the negative y direction. A positive quadrature signal acts in the same direction, and a negative quadrature signal acts in the opposite direction.

In the rotation rate sensor according to the present invention, because of electrode structures applied at suitable parts, especially Coriolis element 2a, 2b, of the sensor structures, by purposeful application of external electrical dc voltages, electrostatic forces changeable over time (dynamic), possibly superimposed by forces that are constant over time (static), are exerted on the sensor structure. By the suitable application of these electrode structures, which from here on are also denoted as quadrature compensation structures or as compensation structures, it is achieved that, during the primary vibration of the sensor structure, forces varying over time are exerted on suitable parts within the sensor structure. These forces are oriented in such a way that they induce secondary vibrations, and may consequently be detected at the means of detection of the Coriolis effect. Because of the height of the electrical voltage, the magnitude of these signals may be detected until they exactly compensate the quadrature signals present in the sensor element because of imperfections of the sensor structure. Consequently, the present invention represents a dynamic method for quadrature compensation.

In FIG. 2 and the subsequent figures dynamic quadrature compensation structures 19, 20 are shown as an example within Coriolis element 2a. According to the present invention, the compensation structures are provided in the form of two substructures, one first substructure 19 compensating for the positive quadrature signal, and a second substructure compensating for the negative quadrature signals. Such two substructures make sense, particularly because, since, according to the present invention, electrostatic forces varying over time are exerted, especially attractive forces, then a rotation of coordinate system K is able to be effected both in the positive and in the negative direction.

Figure 3:
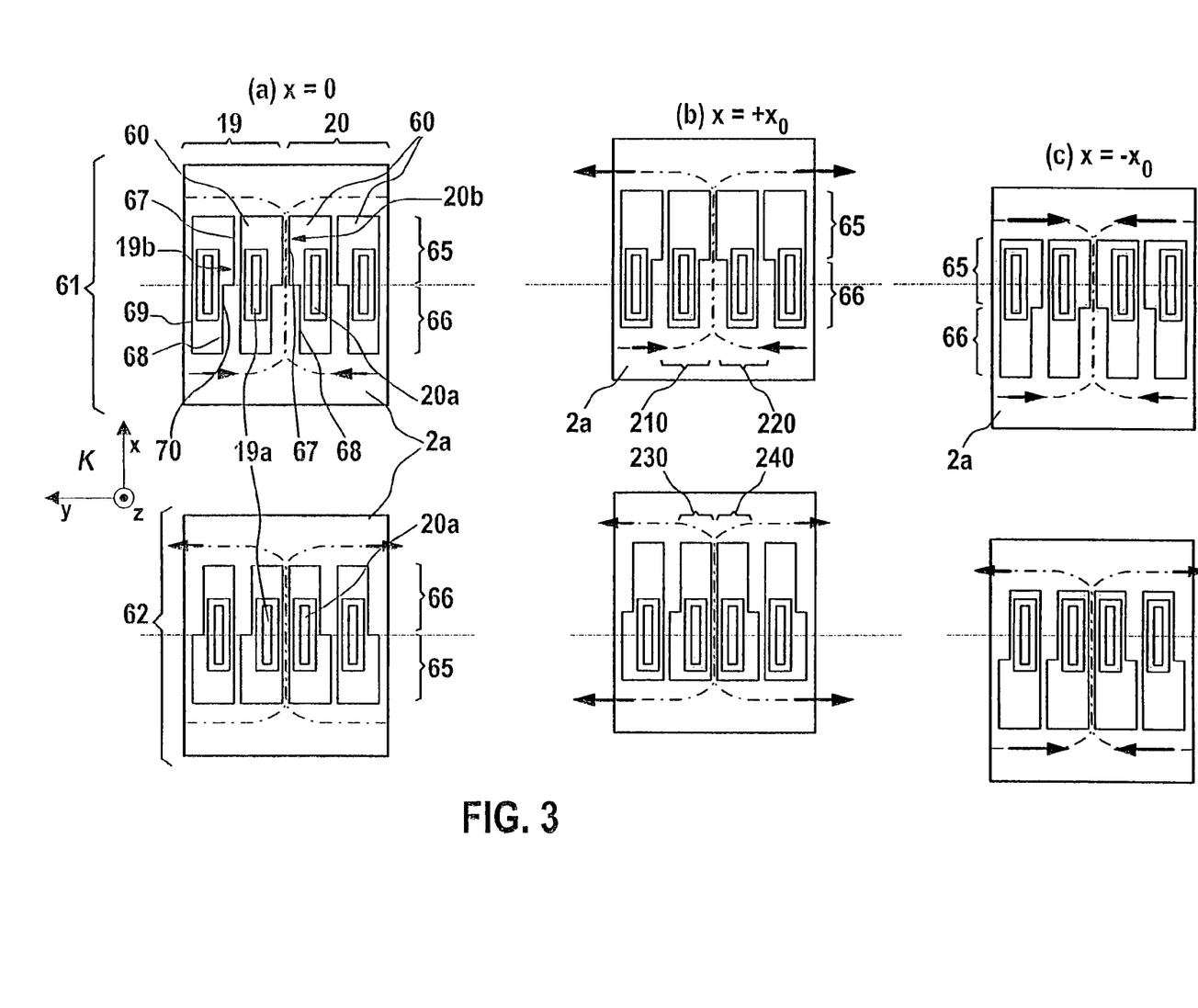
FIG. 3 shows a detailed view of compensation structures according to the present invention of the first specific embodiment of the rotation rate sensor according to the present invention.

In FIG. 3, detailed views of compensation structures 19, 20 are shown as an example of their implementation at Coriolis element 2a.

In FIGS. 2 and 3, especially compensation structures 19, 20 are shown in a detailed view, for a first exemplary embodiment of the rotation rate sensor according to the present invention. In the first exemplary embodiment, compensation structures 19, 20 differ according to whether they are located on a first side of Coriolis element 2a, which in FIG. 2 is shown in the upper part of the figure, or whether they are located on a second side of Coriolis element 2a, In FIGS. 2 and 3, the first side is denoted by reference numeral 61 and the second side is denoted by reference numeral 62.

FIG. 3a shows compensation structures 19, 20 with Coriolis element 2a without excursion of Coriolis element 2a from its equilibrium position (i.e. the displacement of Coriolis element 2a in the X direction vanishes), i.e. X=0. FIG. 3b shows compensation structure 19, 20 with Coriolis element 2a and having an excursion of Coriolis element 2a from its equilibrium position in the positive X direction, i.e. X=+Xo. FIG. 3c shows compensation structure 19, 20 with Coriolis element 2a having an excursion of Coriolis element 2a from its equilibrium position in the negative X direction, i.e. X=−Xo.

Each of substructures 19, 20 of the compensation structure is, according to the present invention, provided in particular as a capacitor device having a fifth electrode and a sixth electrode provided. Suitable regions 60 are cut out from Coriolis element 2a, which will be denoted as cutouts 60 below.

According to the present invention it is provided in all specific embodiments of the rotation rate sensor that each cutout 60 has a greater extension in a first cutout region 65 in the direction of second axis (y) than in a second cutout region 66. Cutout regions 65, 66, according to the present invention, are each particularly provided to be rectangular, they being provided particularly in such a way that one side of the rectangles of cutout regions 65, 66 are provided to be equally long, and that the other side of the rectangles of cutout regions 65, 66 are provided to be of different lengths. According to the present invention, cutout regions 65, 66 are particularly positioned so that the equally long sides of second cutout regions 65, 66 run parallel and especially along the first axis X, as well as that in the direction of the first axis X they "abut" each other in such a way, i.e. in the direction of the X axis they are positioned adjacent to each other in such a way that together they form cutout 60.

Moreover, in all specific embodiments of the present invention, the sidewalls of cutouts 60 in each case form sixth electrode 19b, 20b of electrostatic compensation structure 19, 20. With respect to first cutout region 65 and second cutout region 66 of a cutout 60, sixth electrode 19b, 20b, in each of the cutouts, is divided in two, into a first partial electrode 67 and a second electrode 68. In this connection, first partial electrode 67 is provided as the sidewall of first cutout region 65 and second partial electrode 68 is provided as the sidewall of second cutout region 66. According to the present invention, cutout regions 65, 66 are adjacent in the direction of the first axis, and, because of their different extension in the direction of second axis Y, they form a common sidewall 69 and, on the other of their sides, they form a stepped sidewall 70. In cutouts 60, counterelectrodes (plate capacitor structures) 19a, 20a, that are mechanically rigidly anchored to the substrate, are provided as the fifth electrode. According to the present invention, fifth electrodes 19a, 20a are particularly provided as plates, extending from the substrate into cutouts 60, having in particular a rectangular-shaped cross section. According to the present invention, fifth electrodes 19a and also fifth electrodes 20a are in each case electrically connected to each other, especially via circuit-board conductors underneath the movable structures of the rotation rate sensor, fifth electrodes 19a, however, being provided electrically insulated from fifth electrodes 20a, however, they are designed to be electrically insulated from the substrate, so that at these electrodes 19a, 20a electrical potentials desired may be applied from the outside with respect to the movable sensor structures.

According to the present invention, several positioning possibilities are provided so as to provide cutout regions 65, 66 adjacent to each other to form a cutout 60: The first possibility provides that first cutout region 65 follows second cutout region 66 in the positive direction of first axis X, the common sidewall 69 being provided on the side of the positive Y axis. In FIG. 3b, the first possibility is provided with reference numeral 210. The second possibility provides that first cutout region 65 follows second cutout region 66 in the positive direction of first axis X, the common sidewall 69 being provided on the side of the negative Y axis. In FIG. 3b, the second possibility is provided with reference numeral 220. The third possibility provides that first cutout region 65 precedes second cutout region 66 in the positive direction of first axis X, the common sidewall 69 being provided on the side of the negative Y axis. In FIG. 3b, the third possibility is provided with reference numeral 230. The fourth possibility provides that first cutout region 65 precedes second cutout region 66 in the positive direction of first axis X, the common sidewall 69 being provided on the side of the positive Y axis. In FIG. 3b, the fourth possibility is provided with reference numeral 240.

Furthermore, in all specific embodiments of the present invention it is provided that stationary fifth electrodes (19a, 20a) are provided within the cut out regions in such a symmetrical way that fifth electrodes (19a, 20a) are provided to be asymmetrical in first cutout region 65. This means that fifth electrodes 19a, 20a, in first cutout region 65 are provided, with respect to second axis Y, closer to one of the two sidewalls 69, 70 of first cutout region 65 than to the other of the sidewalls. With respect to the second cutout region, fifth electrodes 19a, 20a are provided to be essentially symmetrical to second cutout region 66.

Now, cutout regions 65, 66 are provided in the first exemplary embodiment in such a way that they are positioned for first compensation structure 19 of first side 61 of Coriolis element 2a according to the first positioning possibility, and for second compensation structure 20 of first side 61 of Coriolis element 2a according to the second positioning possibility. In the first exemplary embodiment it is also provided that cutout regions 65, 66 are positioned for first compensation structure 19 of second side 62 of Coriolis element 2a according to the third positioning possibility, and are positioned for second compensation structure 20 of second side 62 of Coriolis element 2a according to the fourth positioning possibility. Thereby, in the position at rest of Coriolis element 2a, static forces are exerted on Coriolis element 2a in the y direction when external quadrature compensation voltages (electrical dc voltages) are applied between fifth and sixth electrodes 19a. 20a, 19b, 20b. According to the present invention, the magnitude of these forces may be changed, in particular continuously, via the dc voltage between the fifth and sixth electrodes. The direction of the forces is predefined by the asymmetry of the arrangement. These static forces already bring about a slight static quadrature compensation.

In this connection, according to the present invention, first substructure 19 shown in FIG. 3, for first side 61 is in a position to exert forces toward the right, which is shown in the upper part of FIG. 3a by a short arrow pointing to the right in the region of a brace belonging to reference numeral 19. According to the present invention, first substructure 20, shown in FIG. 3, of first side 61 of Coriolis element 2a is in a position to exert forces toward the left, which is shown in the upper part of FIG. 3a by a short arrow pointing to the left in the region of a brace belonging to reference numeral 20. Furthermore, according to the present invention, first substructure 19 for second side 62 of Coriolis element 2a, shown in FIG. 3, is in a position to exert forces toward the left, which is shown in the lower part of FIG. 3a by a short arrow pointing to the left in the region of a brace belonging to reference numeral 19. According to the present invention, second substructure 20 of second side 62, shown in FIG. 3, of Coriolis element 2a is in a position to exert forces toward the right, which is shown in the lower part of FIG. 3a by a short arrow pointing to the right in the region of a brace belonging to reference numeral 20. Corresponding arrows in the other figures point to the action of force of the static forces.

By the suitable positioning of compensation structures 19, 20, it is achieved that, because of the static forces on Coriolis element 2a, a torque about the center of gravity of the partial structure shown in FIG. 2 and denoted by reference symbol S is generated, but that no linear force component in the y direction is present.

The torque on Coriolis element 2a, just by the static forces, leads to a twisting of the sensor structure, and thereby also of the principal axis system of sensor element mechanics K, with reference to the substrate. In this context, the direction of twisting is different for the first and second compensation structure 19, 20.

Using this effect, twisting, predefined by production imperfections, etc, between the principal axis system of sensor element mechanics K and the principal axis system of detection means KD is now able to be partially reversed.

However, the central point of the present invention is the additional dynamic quadrature compensation effect appearing on account of the mechanical asymmetry within the compensation structures. During the motion of the sensor element in primary vibration at amplitude Xo, which is shown in FIGS. 3b and 3c, the areas swept over, between fifth electrodes 19a, 20a and first and second cutout regions 65, 66 of cutouts 60 of Coriolis element 2a, change. From this, there also result periodically changing, resulting forces in the y direction, which is shown by the long arrows shown in FIGS. 3b and 3c, as opposed to the short arrows mentioned above. Consequently, in the first arrangement possibility of cutout regions 65, 66, as was shown in first compensation structure 19 on first side 61, in the case of an excursion of the Coriolis element in positive X axis, a dynamic force is generated in the positive Y axis (to the left), and in the case of an excursion of Coriolis element 2a in negative X axis, a dynamic force is generated in the negative Y axis (to the right). In the case of the second arrangement possibility of cutout regions 65, 66, as was shown in second compensation structure 20 on first side 61, in the case of a excursion of Coriolis element 2a in positive X axis, a dynamic force is generated in the negative Y axis (to the right), and in the case of an excursion of Coriolis element 2a in negative X axis, a dynamic force is generated in the positive Y axis (to the left). In the case of the third arrangement possibility of cutout regions 65, 66, as was shown in first compensation structure 19 on second side 62, in the case of a excursion of the Coriolis element in the positive X axis, a dynamic force is generated in the positive Y axis (to the left), and in the case of an excursion of Coriolis element 2a in negative X axis, a dynamic force is generated in the negative Y axis (to the right). In the case of the fourth arrangement possibility of cutout regions 65, 66, as was shown in second compensation structure 20 on second side 62, in the case of an excursion of Coriolis element 2a in the positive X axis, a dynamic force is generated in the negative Y axis (to the right), and in the case of an excursion of Coriolis element 2a in the negative X axis, a dynamic force is generated in the positive Y axis (to the left).

Consequently, the entire effective force on Coriolis element 2a is composed of a static proportion—short arrows—and a dynamic proportion—long arrows.

It is achieved, by the suitable orientation of the compensating structure, that the resulting effective dynamic force contributions with regard to positive and negative compensation point in opposite directions.

The dynamic force contribution is directly proportional to the excursion of the sensor structure in the primary vibration, and acts in the y direction. Consequently, it corresponds directly to a quadrature signal. Thus, for positive and negative quadrature signals in the sensor element, an electrical compensation voltage with respect to the movable sensor structure would be applied to one of the two compensation structures.

Figure 4:
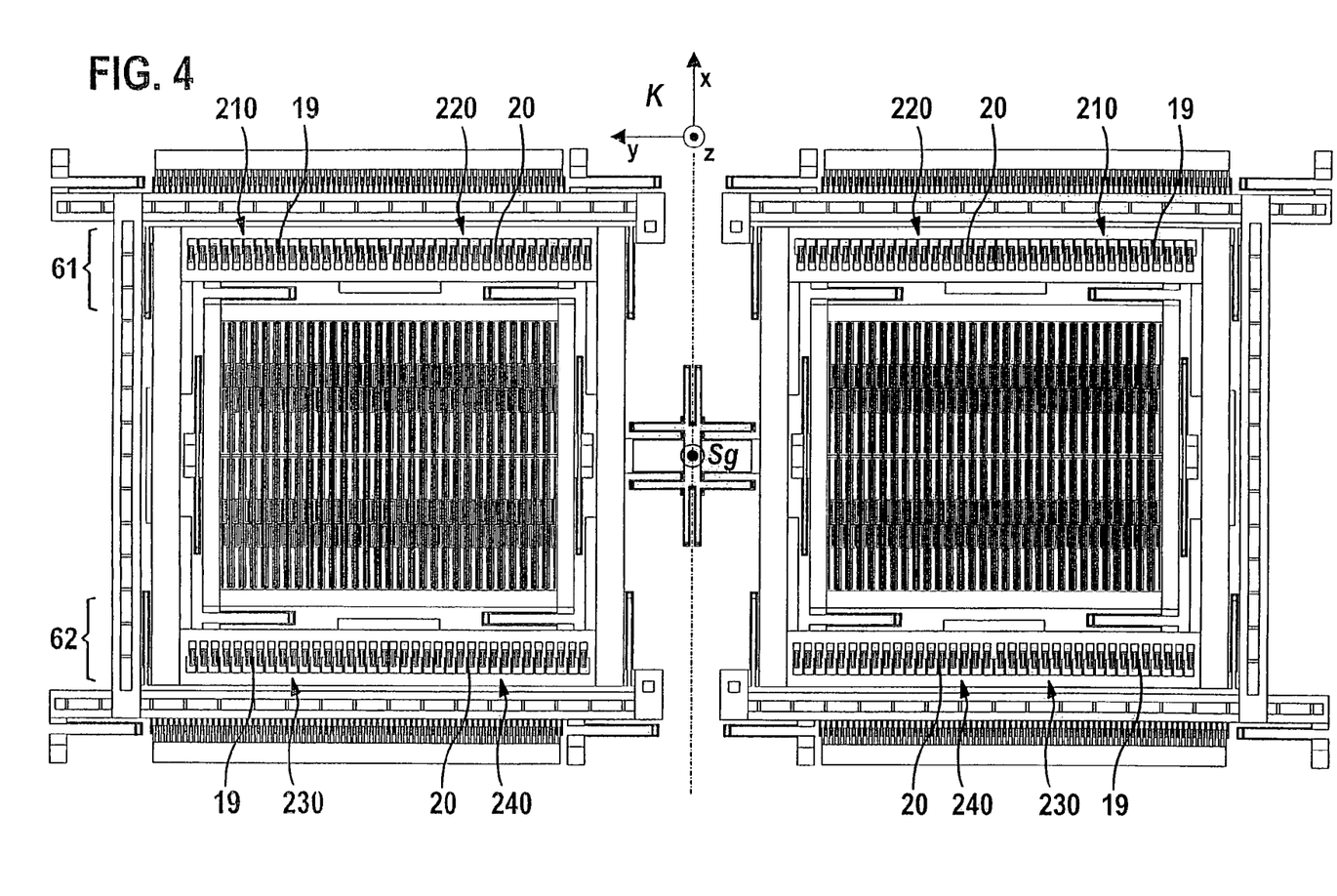
FIG. 4 shows a rotation rate sensor according to the present invention in a detailed view.

The magnitude of the dynamic force contribution, and thus the magnitude of the quadrature compensation may take place by variation in the electrical voltage applied The positioning of the compensation structure on the second partial structure 50b of the rotation rate sensor shown in FIG. 1 is produced by a symmetry operation, for example, a rotation by 180° about the overall center of gravity Sg from first partial structure 50b. FIG. 4 shows the two partial structures 50a and 50b, and the overall center of gravity denoted by reference symbol Sg. FIG. 4 also shows first side 61 and second side 62, and the distribution of compensation structures 19, 20 with respect to the two sides 61, 62. As was shown in connection with FIG. 3, from this there follows, for first partial structure 50a, for first compensation structure 19 on first side 61, the first possibility 210, for second compensation structure 20 on first side 61, the second possibility 220, for first compensation structure 19 on second side 62, the third possibility 230 and for second compensation structure 20 on second side 62, the fourth possibility 240. For second partial structure 50b, there follow for the example of rotation by 180° as symmetry operation the same associations of compensation structures 19, 20 and possibilities 210, 220, 230, 240 with this difference, that on both sides 61, 62, first compensation structure 19 is not provided as in first partial structure 50a to the left (positive Y direction) of second compensation structure 20, but to the right of it (negative Y direction).

It is essential for the effect of the dynamic quadrature compensation that the compensation structure be mounted at parts of the sensor elements which participate both in the primary vibration and the secondary vibration. For the rotation rate sensors explained as examples, this means only Coriolis element 2a, 2b. Mounting compensation structures 19, 20 at sensor elements participating in only one of the vibrations would not bring about any dynamic compensation effect.

The first specific embodiment distinguishes itself in that it leads to a superimposition of static and dynamic quadrature compensation effect, and that the mass distribution inside Coriolis element 2a, 2b remains symmetrical to a great extent at compensation structures 19, 20.

In FIG. 2 the effect of the static compensation forces is explained in greater detail. By the suitable positioning of compensation structures 19, 20, it is achieved that, because of the static forces (short arrows) on Coriolis element 2a, a torque about the center of gravity, denoted by reference symbol S in FIG. 2, of Coriolis element 2a is generated, but that no linear force component in the y direction is present, because of the static compensation forces. According to the present invention, because of the voltages applied to compensation structures 19, 20, the force effect is such that a twisting of, in the present example, Coriolis element 2a, and thus also a twisting of the principal axis system of Coriolis element 2a is effected with respect to the substrate. If Coriolis element 2a is in a rest position in the X direction, because of the positioning of substructures 19, 20, and by applying a voltage to first substructure 19, there comes about a twisting of, or rather a torque on Coriolis element 2a clockwise in FIG. 2, and by applying a voltage to second substructure 20, there comes about a twisting of, or rather a torque on Coriolis element 2a counterclockwise in FIG. 2.

The dynamic force contributions shown by long arrows, which appear when Coriolis element 2a is deflected from its rest position with respect to the X direction, cause a linear force effect which, in the X direction of positive excursion of Coriolis element 2a, is oriented for first compensation structure 19 in the positive Y direction, and for second compensation structure 20 in the negative Y direction.

Because of the superimposition of the dynamic and the static force contributions, according to the present invention it is advantageously possible to carry out a quadrature compensation.

Further exemplary embodiments of the present invention are shown below, with particular focus on the differences from the example discussed up to now.

Figure 5:
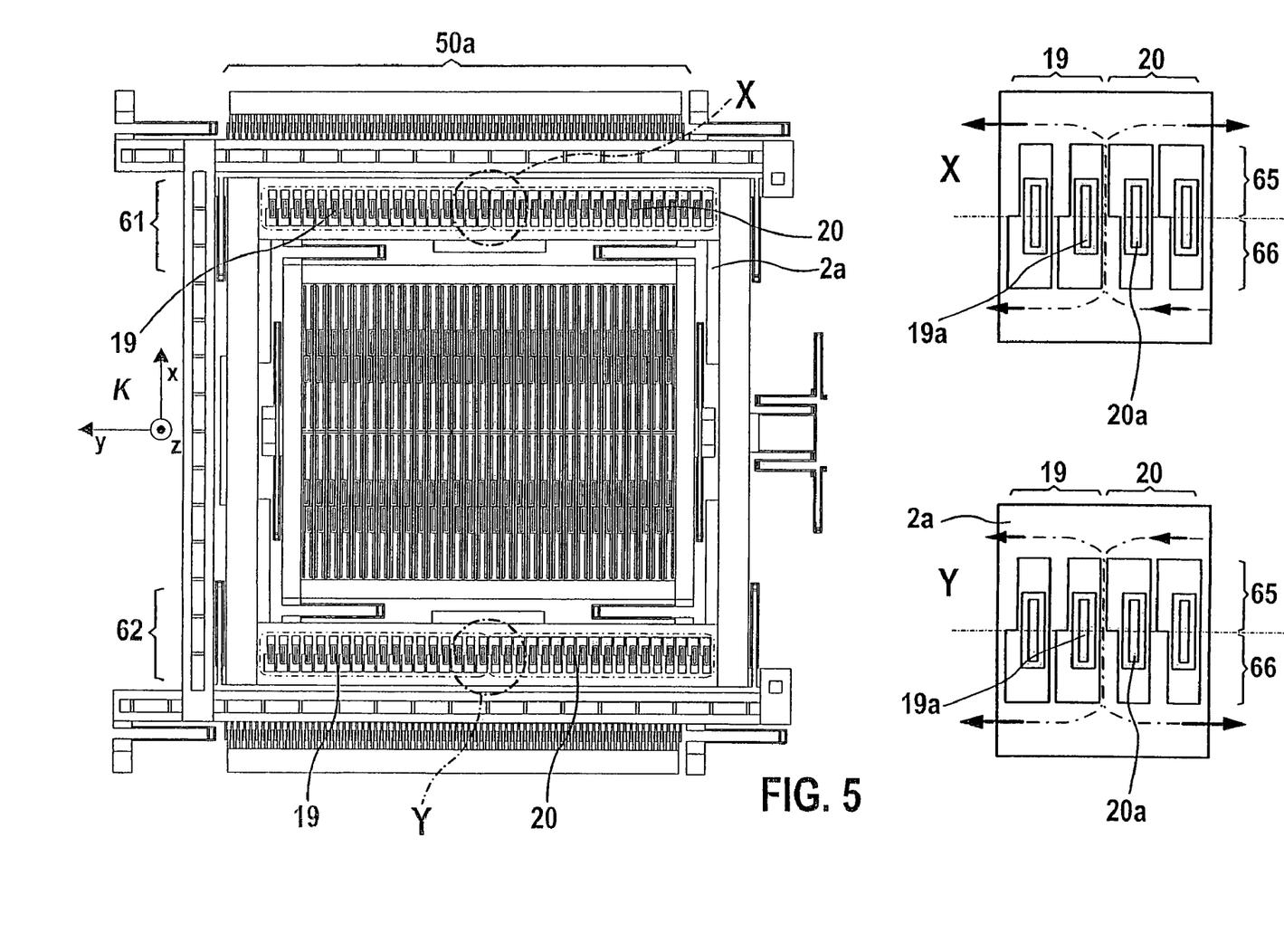
FIG. 5 shows a partial structure of a second specific embodiment of a rotation rate sensor according to the present invention in a detailed view.

The second exemplary embodiment in FIG. 5 differs by the geometrical positioning of first and second substructures 19, 20. For simplicity's sake, first partial structure 50a of a rotation rate sensor according to the present invention is shown again in FIG. 5. On first side 61 of Coriolis element 2a, in the left part (in the direction of the positive Y axis) a number of first substructures 19 are provided, and in the right part a number of second substructures 20 are provided. On second side 62 of Coriolis element 2a, in the left part (in the direction of the positive Y axis) a number of first substructures 19 are provided, and in the right part a number of second substructures 20 are provided. In the second exemplary embodiment, first substructures 19 are provided on first side 61 and on second side 62 according to third positioning possibility 230. In the second exemplary embodiment, second substructures 20 are provided on first side 61 and on second side 62 according to second positioning possibility 220. Correspondingly, the dynamic and the static force effects are shown again by long and short arrows in FIG. 5, and they correspond to what was described for FIG. 3 with respect to second and third positioning possibilities 220, 230, respectively, of cutout regions 65, 66. Because of the changed positioning of cutout regions 65, 66, with reference to the first exemplary embodiment, it is achieved that in the rest position of the sensor, i.e. not having excursion in the X direction of the Coriolis element, no resulting torque acts upon the sensor structure (short arrows in FIG. 5). Consequently, in this arrangement, no static quadrature compensation becomes effective.

Figure 6:
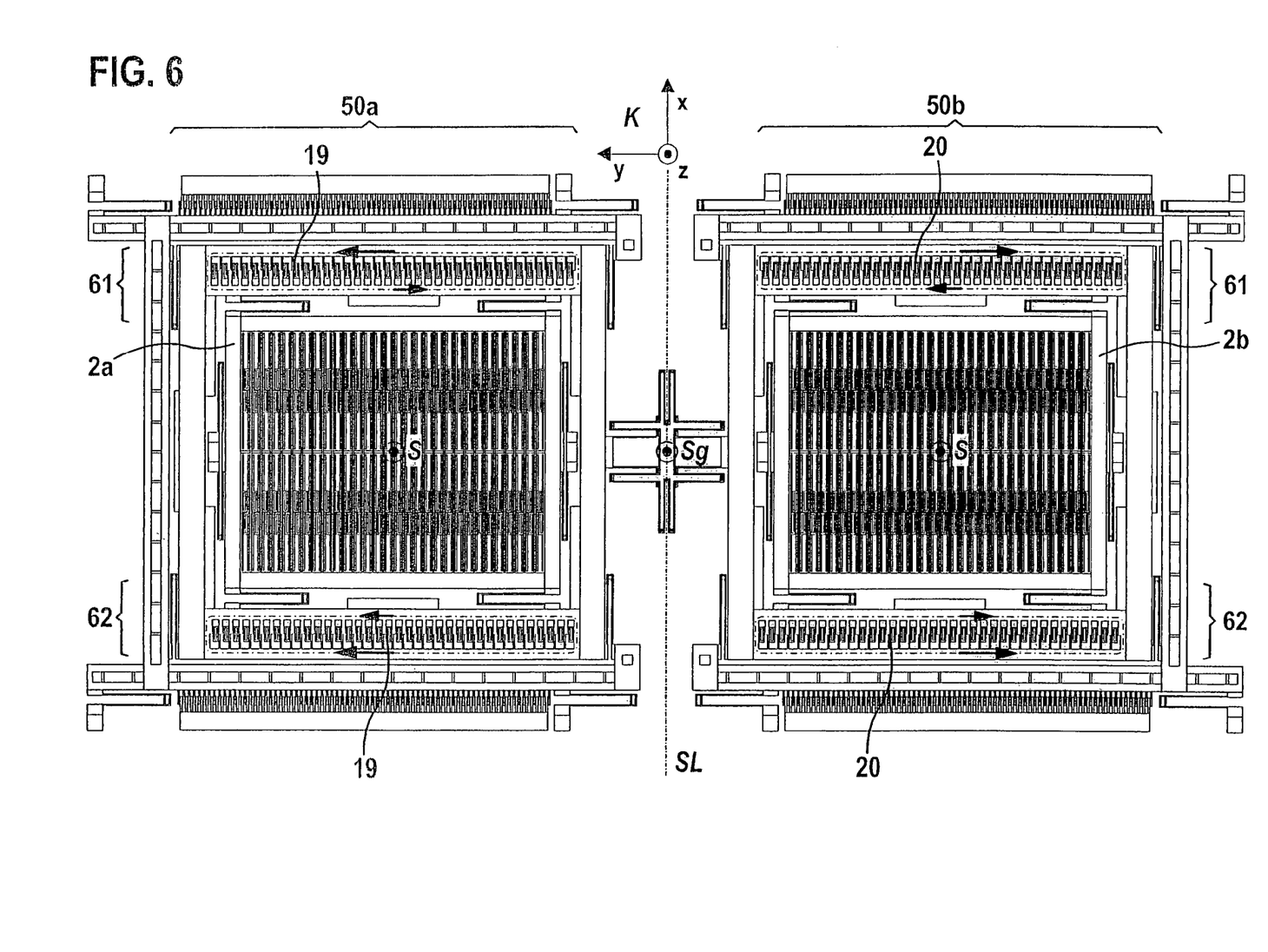
FIG. 6 shows a rotation rate sensor according to the present invention according to a third specific embodiment in a detailed view.
Figure 7:
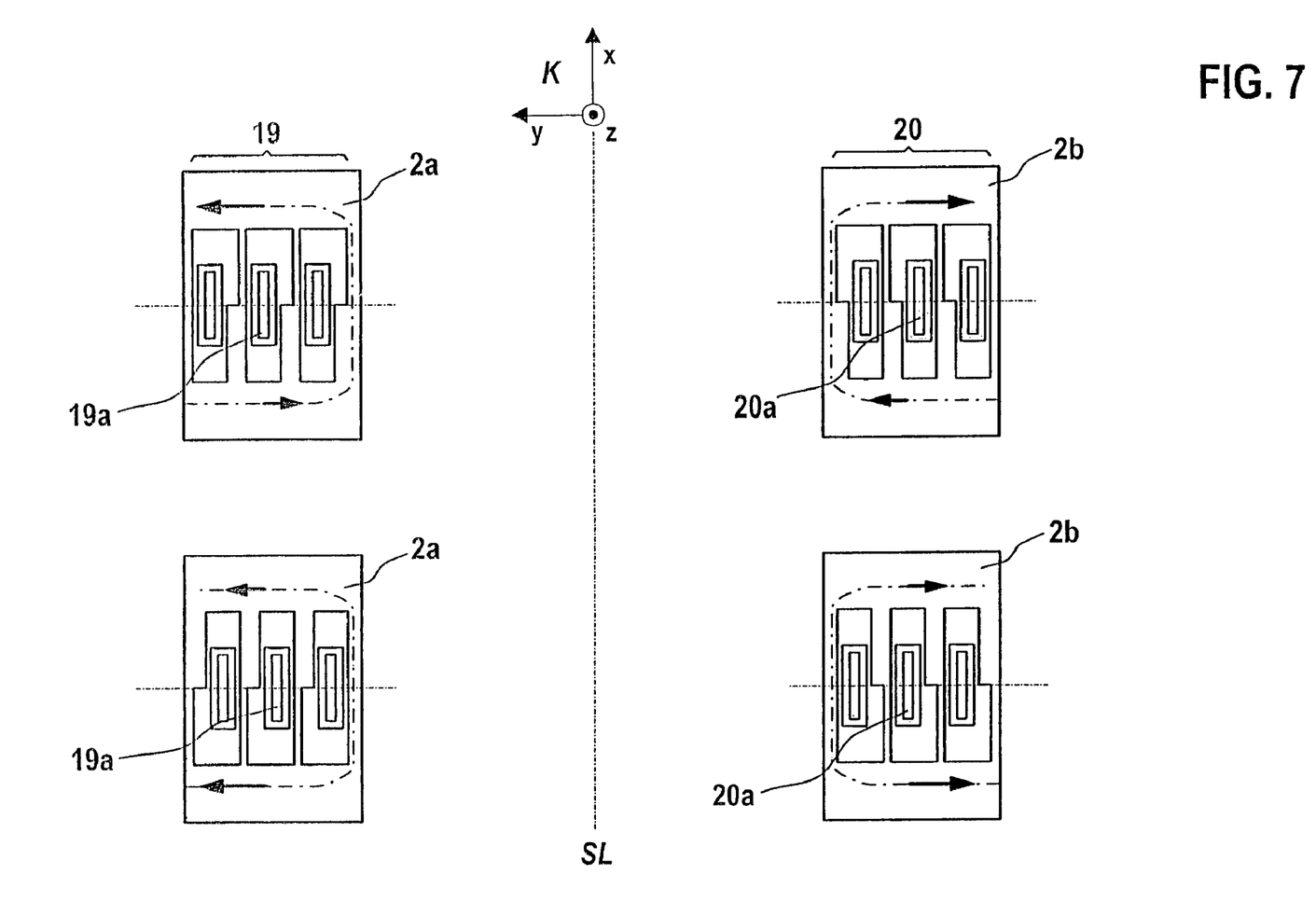
FIG. 7 shows a detailed view of compensation structures according to the present invention of the third specific embodiment.

The compensation system in FIG. 6 or the detail section in FIG. 7 shows a third specific embodiment of the present invention, and stands out in that the compensation structures 19, 20 are each localized on only one of partial structures 50a, 50b. First substructure 19 is exclusively localized on first partial structure 50a, and second substructure 19 is exclusively localized on second partial structure 50b. First substructure 19 and second substructure 20 are differently provided as in the first exemplary embodiment on first side 61 and second side 62, namely: For first side 61 and first substructure 19, first positioning possibility 210, for first side 61 and second substructure 20, second positioning possibility 220, for second side 62 and first substructure 19, third positioning possibility 230, and for second side 62 and second substructure 20, fourth positioning possibility 240. Consequently, likewise, both a static (torque) and a dynamic quadrature compensation becomes effective. One advantage of the system in FIG. 6 is that it is more simply implementable because of the lower number of printed circuit traces. Since, as a rule, only either the first or the second substructures are controlled, the compensation forces act upon only one of partial structures 50a, 50b; however, because of the active mechanical coupling of the two partial structures 50a, 50b, the compensation forces are transmitted respectively to the other partial structure. The system of the compensation structure for negative quadrature on second partial structure 50b (FIGS. 6 and 7, right) may be produced by a symmetry operation—in particular a mirroring at the symmetry line furnished with the reference symbol SL by the overall center of gravity furnished with the reference symbol Sg—from the first compensation structure for positive quadrature on the first partial structure (FIGS. 6 and 7, left).

Figure 8:
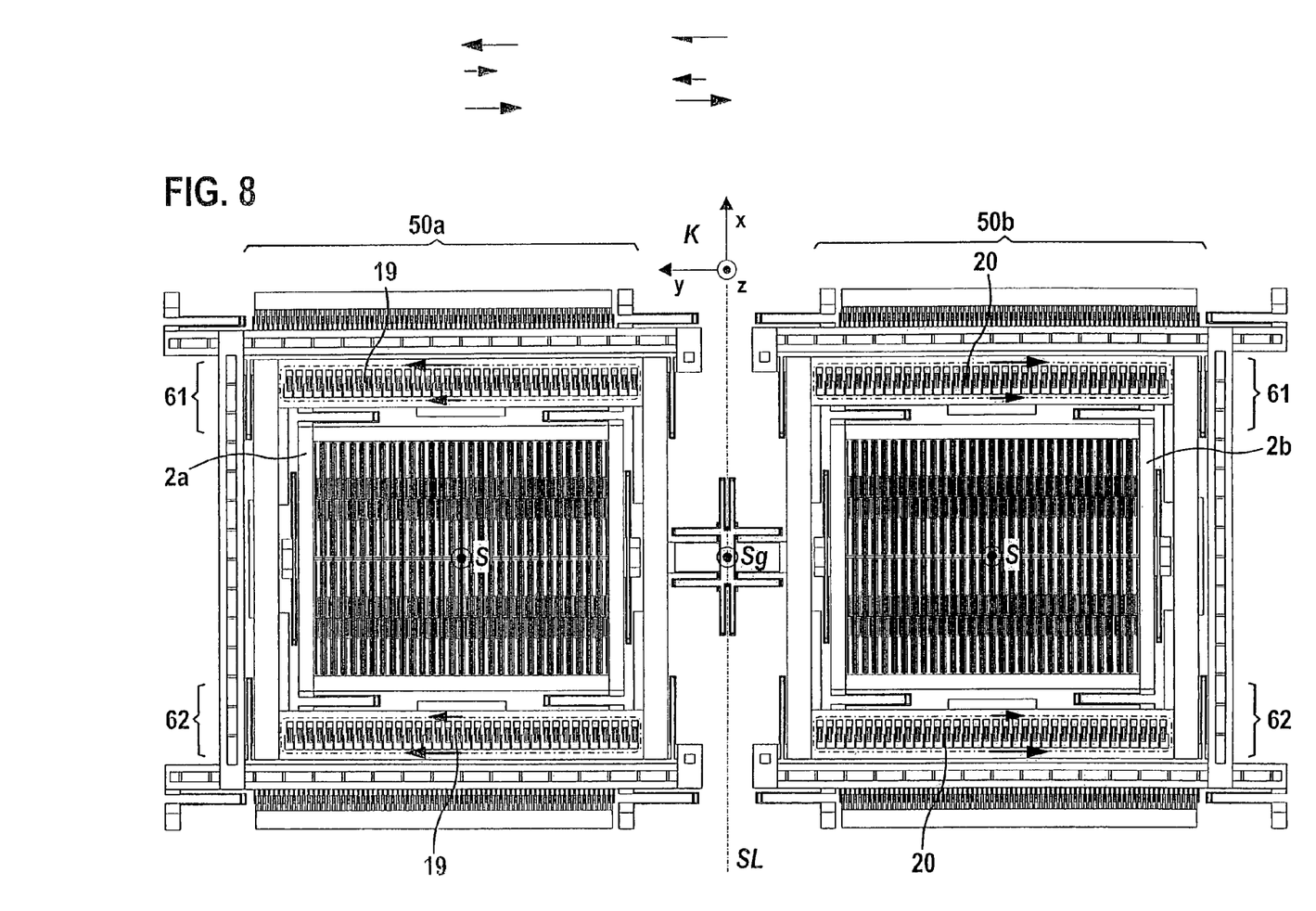
FIG. 8 shows a rotation rate sensor according to the present invention according to a fourth specific embodiment in a detailed view.
Figure 9:
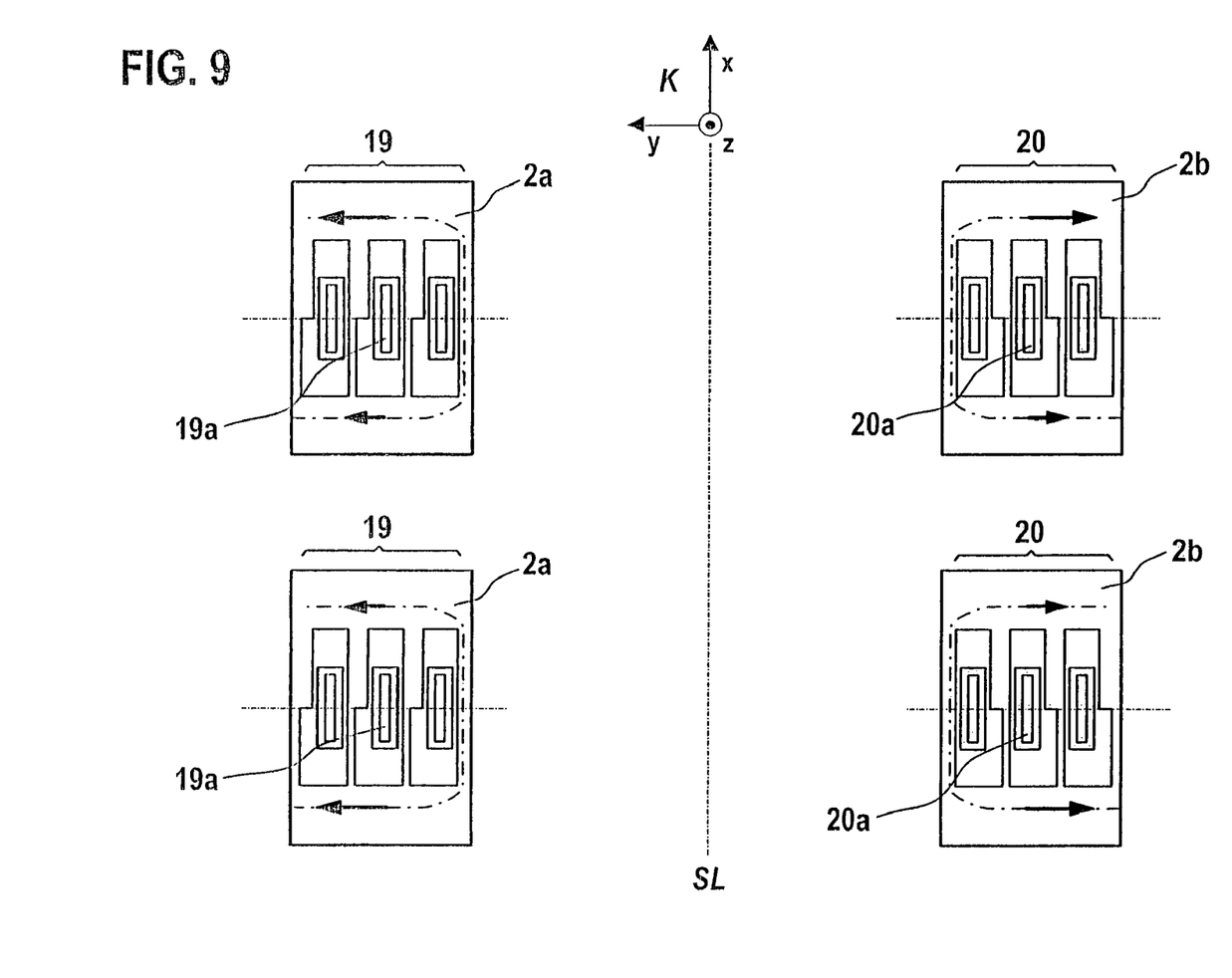
FIG. 9 shows a detailed view of compensation structures according to the present invention of the fourth specific embodiment.

The rotation rate sensor according to the present invention in FIG. 8, or the detailed cutout in FIG. 9, according to a fourth specific embodiment, differs in turn by the orientation of cutout sections 65, 66 of compensation structures 19, 20 within Coriolis elements 2a and 2b, respectively. Here too, first substructure 19 or second substructure 20 are localized on one respective partial structure 50a, 50b (left or right, respectively). First substructure 19 is provided equally for first side 61 and second side 62. Second substructure 20 is also provided equally for first side 61 and second side 62. Third positioning possibility 230 of cutout regions 65, 66 is provided for first substructure 19. Fourth positioning possibility 240 of cutout regions 65, 66 is provided for second substructure 20. By this changed orientation it is achieved that in the sensor's rest position no resulting torque acts upon the sensor structure (short arrows in FIGS. 8 and 9). Consequently, in this arrangement, no static quadrature compensation becomes effective. Here too, the system of the compensation structure for negative quadrature on second partial structure (FIGS. 8 and 9, right) may be produced by a symmetry operation (mirroring at the symmetry line furnished with the reference symbol SL by the overall center of gravity furnished with the reference symbol Sg) from the first compensation structure for positive quadrature on the first partial structure (FIGS. 8 and 9, left).

The present invention describes possibilities for the reduction of interference signals in micromechanical rotation rate sensors having the following advantages:

A simple, reliable and cost-effective electrostatic method for quadrature compensation (electrical compensation) is proposed, in contrast to costly (iterative) physical balancing methods.

Reduction of the quadrature takes place in the sensor element itself. Consequently, no quadrature signals arise at the means of detection for the Coriolis effect, which results in clearly reduced requirements on the primary sensor signal evaluation and improved sensor performance, respectively.

The method is based, in particular, on the effect of dynamic forces. Because of that, compared to a purely static compensation method, a clearly greater compensation range is accessible.

The method is based on the use of suitable asymmetries within the mechanical sensor structure. Consequently, compensation may take place by a single exterior potential (dc voltage).

The present invention may be used for whole classes of rotation rate sensors, especially vibration gyroscopes, whose primary and secondary vibrations proceed within the plane of the substrate. In addition, the present invention is compatible with the most varied sensor evaluation circuit concepts.

What is claimed is:

1. A rotation rate sensor, comprising:
    a substrate;
    at least one Coriolis element situated above a surface of the substrate, the at least one Coriolis element being able to be induced to vibrate in parallel to a first axis, wherein:
        an excursion of the at least one Coriolis element is detectable based on a Coriolis force in a second axis that is substantially perpendicular to the first axis, and
        the first axis and the second axis are parallel to the surface of the substrate; and
    electrode structures for generating a dynamic force effect, wherein the dynamic force is directly generated by the electrode structures;
    wherein:
        the electrode structures include a first electrode substructure and a second electrode substructure,
        the first substructure and the second substructure are asymmetrical,
        for each of the first substructure and the second substructure at least one cutout of the at least one Coriolis element is provided, and
        the at least one cutout has a greater extension in a first cutout region in a direction of the second axis than in a second cutout region.

2. The rotation rate sensor as recited in claim 1, wherein: the dynamic force effect is between the substrate and the at least one Coriolis element.

3. The rotation rate sensor as recited in claim 1, wherein: there is a static force effect, in addition to the dynamic force affect, between the substrate and the at least one Coriolis element.

4. The rotation rate sensor as recited in claim 3, wherein: the static force effect corresponds to a torque with respect to a third axis that is substantially perpendicular to the surface of the substrate.

5. The rotation rate sensor as recited in claim 1, wherein:
    the at least one Coriolis element includes a first Coriolis element and a second Coriolis element,
    the first Coriolis element and the second Coriolis element are positioned symmetrically to each other, and
    the first Coriolis element and the second Coriolis element are mechanically coupled to each other.

6. The rotation rate sensor as recited in claim 3, wherein: at least one of the dynamic force effect and the static force effect is provided as a function of at most two controlled variables.

7. The rotation rate sensor as recited in claim 6, wherein: the two controlled variables are electrical dc voltages.

8. The rotation rate sensor as recited in claim 1, further comprising:
a first driving arrangement by which the at least one Coriolis element is able to be induced to vibrate parallel to the first axis; and
a second driving arrangement by which an excursion of the at least one Coriolis element is detectable in the second axis on account of the Coriolis force.

* * * * *